(12) United States Patent
Rider et al.

(10) Patent No.: US 11,604,653 B2
(45) Date of Patent: Mar. 14, 2023

(54) IDENTIFYING DEPENDENCIES IN A CONTROL SEQUENCE FOR EXECUTION ON A HARDWARE ACCELERATOR

(71) Applicant: INTERNATIONAL BUSINESS MACHINES CORPORATION, Armonk, NY (US)

(72) Inventors: Scot Rider, Pleasant Valley, NY (US); Marcel Schaal, Fort Montgomery, NY (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 17/119,251

(22) Filed: Dec. 11, 2020

(65) Prior Publication Data

US 2022/0188119 A1 Jun. 16, 2022

(51) Int. Cl.
*G06F 9/38* (2018.01)
*G06F 11/07* (2006.01)

(52) U.S. Cl.
CPC .......... *G06F 9/3838* (2013.01); *G06F 11/076* (2013.01); *G06F 11/0721* (2013.01); *G06F 11/0775* (2013.01); *G06F 11/0793* (2013.01)

(58) Field of Classification Search
CPC .. G06F 9/3838; G06F 11/0721; G06F 11/076; G06F 11/0775; G06F 11/0793
See application file for complete search history.

(56) References Cited

U.S. PATENT DOCUMENTS

| 4,658,351 | A | 4/1987 | Teng | |
|---|---|---|---|---|
| 6,772,324 | B2 * | 8/2004 | Akkary | G06F 9/383 |
| | | | | 712/216 |
| 7,469,375 | B2 * | 12/2008 | Anand | G06F 11/3664 |
| | | | | 714/49 |
| 7,600,221 | B1 * | 10/2009 | Rangachari | G06F 9/3808 |
| | | | | 712/226 |
| 11,243,775 | B2 | 2/2022 | Ayupov et al. | |
| 2006/0161903 | A1 | 7/2006 | Anand et al. | |
| 2007/0240070 | A1 | 10/2007 | Eldridge et al. | |
| 2012/0303909 | A1 | 11/2012 | Bakke et al. | |
| 2019/0187966 | A1 | 6/2019 | Carey et al. | |
| 2020/0193680 | A1 | 6/2020 | Van Benthem | |
| 2020/0366573 | A1 | 11/2020 | White et al. | |

OTHER PUBLICATIONS

International Search Report and Written Opinion for International Application PCT/CN2021/132680; International Filind Date: Nov. 24, 2021; dated Feb. 23, 2022; 9 pages.

* cited by examiner

*Primary Examiner* — Zachary K Huson
(74) *Attorney, Agent, or Firm* — Cantor Colburn LLP; Teddi Maranzano

(57) ABSTRACT

Provided are embodiments for a computer-implemented method, system and computer program product for identifying dependencies in a control sequence. Embodiments include receiving a control block that comprises a first error dependency (EDEP) level, maintaining the first EDEP level, and determining whether the received control block was successfully executed. Embodiments also include receiving a subsequent control block that comprises a second EDEP level, comparing the first EDEP level and the second EDEP level, and providing the subsequent control block for execution based at least in part on the successful execution of the received control block, and on the second EDEP level being less than or equal to the first EDEP level.

20 Claims, 4 Drawing Sheets

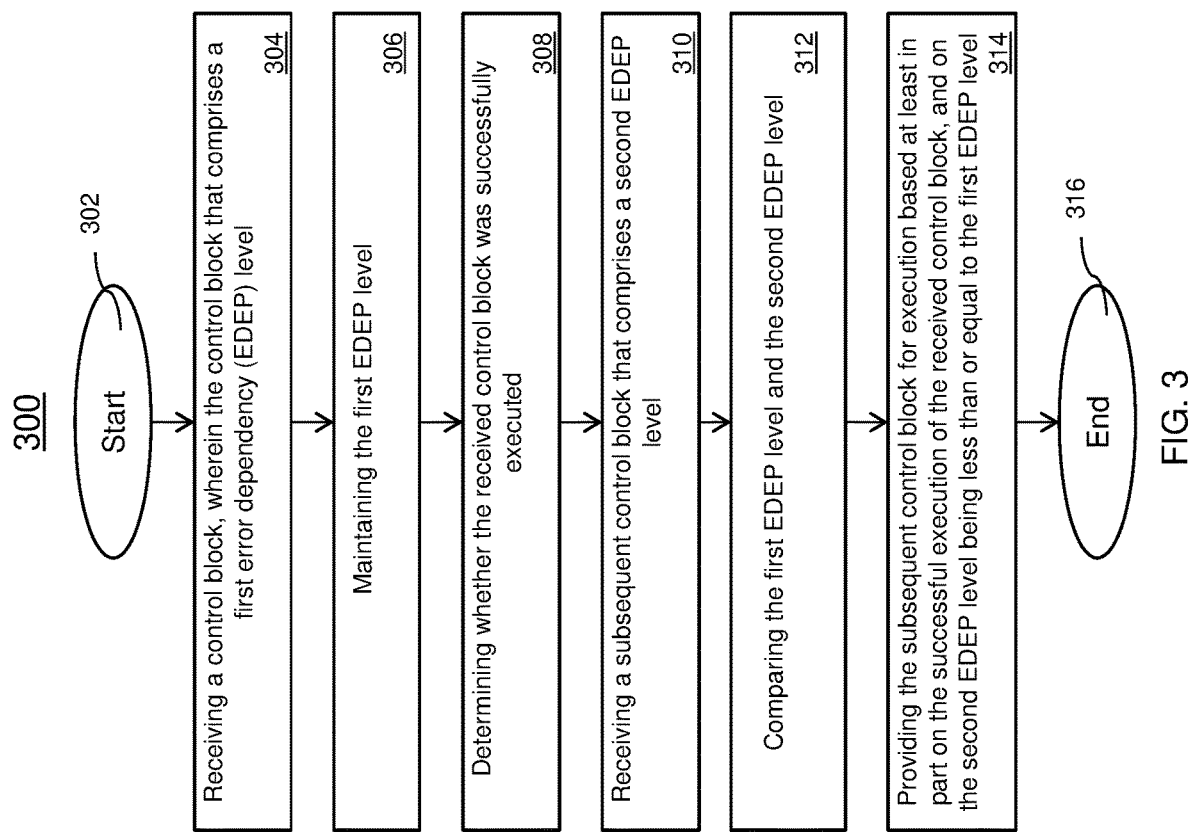

IDENTIFYING DEPENDENCIES IN A CONTROL SEQUENCE FOR EXECUTION ON A HARDWARE ACCELERATOR

BACKGROUND

The present invention relates to computer hardware, and more specifically, to identifying dependencies in a control sequence for execution on a hardware accelerator.

Various acceleration techniques can be used to increase the efficiency of performing various computing tasks. Hardware acceleration achieves efficiency improvements by off-loading various tasks to highly specialized hardware, such as graphics processing units (GPU) and application-specific integrated circuits (ASIC). Software acceleration techniques are designed to maximize the system functions that are performed in software prior to offloading other functions to external hardware.

SUMMARY

Embodiments of the present invention are directed to a computer-implemented method for identifying dependencies in a control sequence for execution on a hardware accelerator. A non-limiting example of the computer-implemented method includes receiving a control block that includes a first error dependency (EDEP) level, maintaining the first EDEP level, and determining whether the received control block was successfully executed. The computer-implemented method also includes receiving a subsequent control block that comprises a second EDEP level, comparing the first EDEP level and the second EDEP level, and providing the subsequent control block for execution based at least in part on the successful execution of the received control block, and on the second EDEP level being less than or equal to the first EDEP level. Also provided are embodiments of the present invention that are directed to a system and a computer program product for identifying dependencies in a control sequence for execution on a hardware accelerator.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 depicts a flowchart of a method for identifying dependencies in a control sequence in accordance with one or more embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

One or more embodiments of the present invention provide a hardware accelerator that enqueues a plurality of control block (CB) instructions intended to be executed in a pre-determined sequence. Control blocks may exhibit relationships to the preceding control blocks and subsequent control blocks. If an error occurs during the execution of a control block, one or more control blocks may need to be re-processed to complete a job or task properly.

Contemporary systems do not provide a mechanism to track the dependencies between the control blocks that are required to be executed in a predetermined sequence or control blocks of another independent sequence. In such an event where a control block fails upon which one or more subsequent control blocks depend, the subsequent dependent control blocks are still processed. Because the sequence of control blocks was executed including the failed control blocks, the entire sequence of control blocks must be re-queued into the control block storage queue and re-executed. This can result in a performance loss of the system. Also, if another independent sequence of control blocks are queued after the sequence of control blocks including the failed control block, the independent sequence of control blocks must still wait for the complete processing of the control blocks that are dependent on the failed control block also causing a delay.

One or more embodiments of the present invention address one or more of the above-described shortcomings of the prior art by providing a mechanism where the dependencies between a sequential stream of control blocks can be identified so that if one control block fails, the execution unit can automatically abort processing any subsequent control blocks depending on the failing control block, and then automatically resume execution when there is no longer a dependency on the control block.

Figure 1:
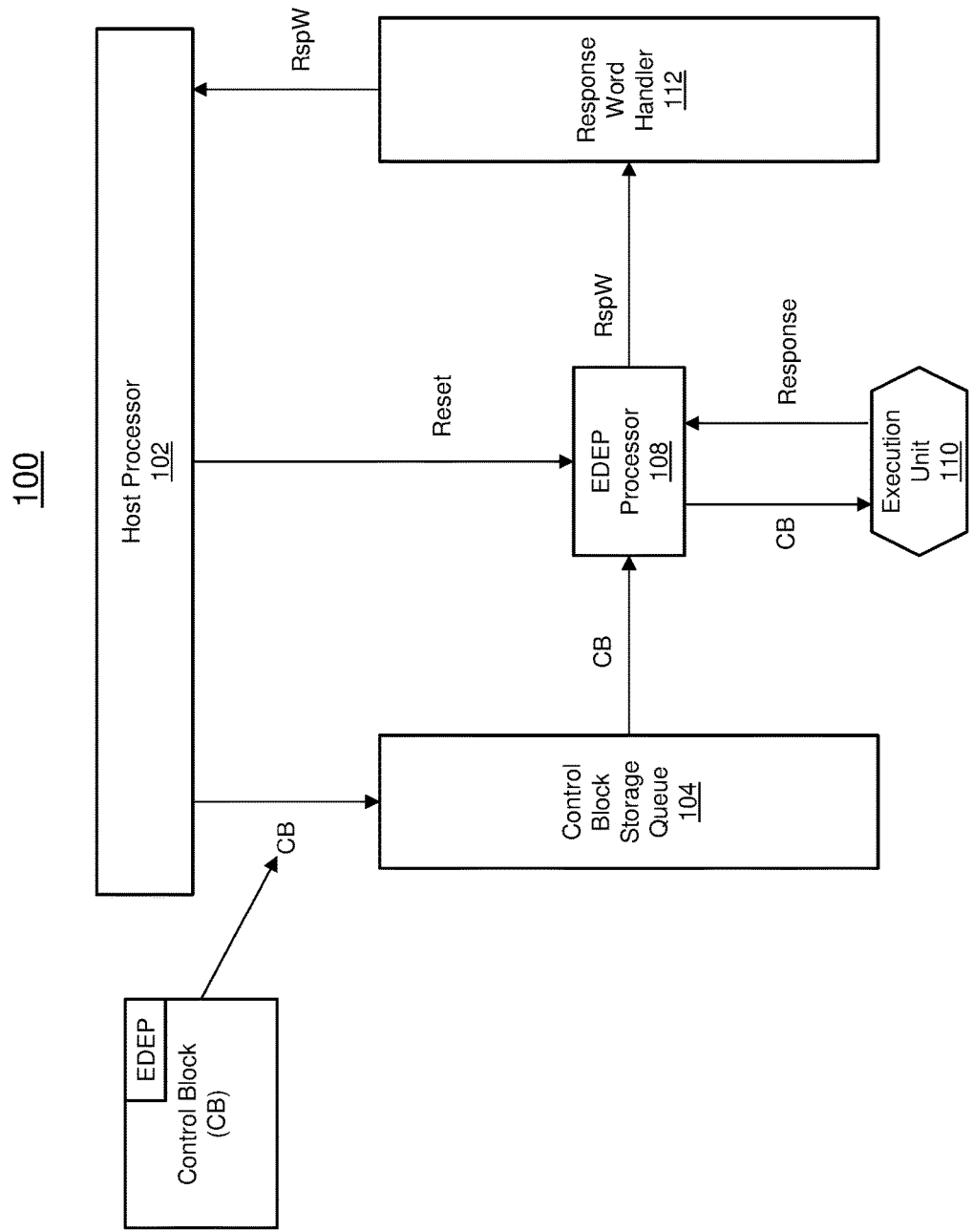
FIG. 1 depicts a block diagram of a system in accordance with one or more embodiments of the invention.
Figure 4:
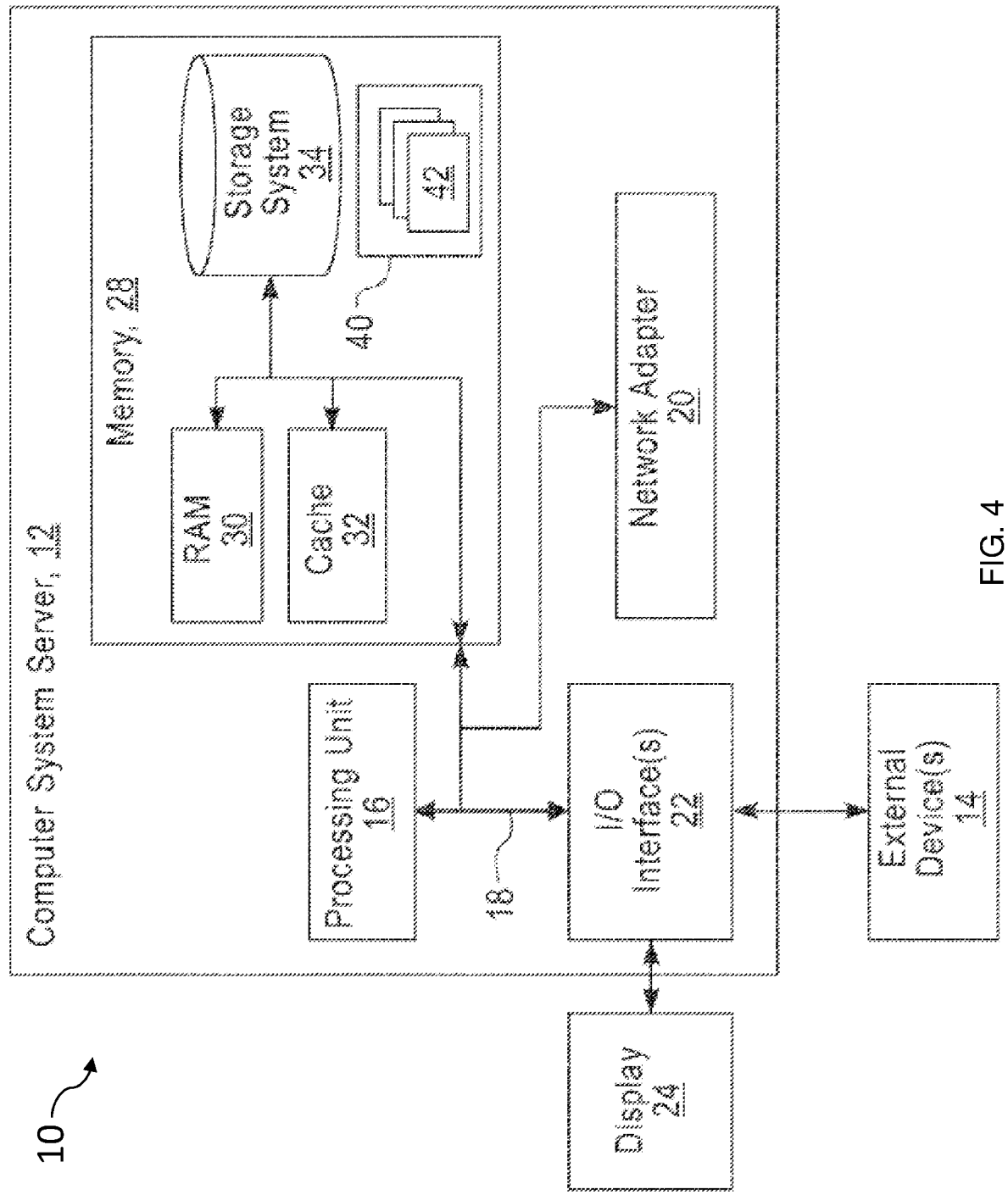
FIG. 4 depicts a block diagram of a computer system in accordance with one or more embodiments of the invention.

Turning now to FIG. 1, a block diagram of a system 100 for identifying dependencies in a control sequence is generally shown in accordance with one or more embodiments of the invention. In some embodiments of the invention, the system 100 can be implemented in a computing system server 12 in the computing node 10 as shown in FIG. 4. The system 100 includes a host processor 102. The host processor 102 is configured to assign an error dependency (EDEP) level to each control block (CB), and the host processor 102 is configured to provide the control block to the control block storage queue 104. In some embodiments, the host processor 102 can include one or more hardware and/or software instructions for configuration. The hardware can include one or more elements of the computing node 10 shown in FIG. 1. Each control block is programmed with an EDEP level assigned from the host processor 102. The EDEP level can be 2-bits in length and indicates the hierarchical dependencies between the control blocks in the control sequence. The EDEP level defines whether a subsequent control block should be executed if a previous control block in the hierarchy fails execution.

In accordance with one or more embodiments of the present invention, the control block storage queue 104 is configured to store one or more control blocks. As the control blocks reach the head of the storage queue, they are provided to the EDEP processor 108 In accordance with one or more embodiments of the present invention, the EDEP processor 108 is configured to perform several functions including but not limited to receiving a control block from the control block storage queue 104, providing the control block to the execution unit 110, processing a response from the execution unit 110, providing a response word to the response word handler 112, receiving a reset signal from the host processor 102, and more.

The EDEP processor 108 can be further configured to detect if a failure has occurred during the execution of the control blocks at the execution unit 110. An error can occur for various reasons. For example, an error can occur during execution when a "divide by zero" operation or parity occurs. In the event an error is detected, the execution unit 110 can provide an indication to the EDEP processor 108 of such error. If the error is detected, each subsequent control block that is dependent upon the failed control block which is indicated by the EDEP level is not executed by the execution unit 110. Therefore, when the subsequent control blocks that are dependent on the failed control block are received from the control block storage queue 104 and identified, the control blocks are abended (abnormal ending). The control block is not executed and a response word (RspW) indicating that the control block was not executed is produced.

The EDEP processor 108 is configured to analyze the EDEP level of the received control block and maintain the current EDEP level, where the EDEP level indicates the dependency among the control blocks. Responsive to determining that an error has occurred, the EDEP processor 108 analyzes the EDEP level of each subsequently received control block to determine whether or not the control block should be passed to the execution unit 110 for execution.

For example, if a control block having an EDEP level=0 is determined to have failed at the EDEP processor 108, then all subsequent CBs with EDEP level=0 received at the EDEP processor 108 with EDEP level=0 do not need to be processed. Therefore, upon receipt, at the EDEP processor 108, the control blocks are abended and not passed along to the execution unit 110 for execution. By not executing the control blocks at the EDEP processor 108 at the execution unit 110, the processing delay is improved since the subsequent control blocks that depend on a failed control are not processed.

In a scenario where a control block of EDEP level n fails execution, then all subsequent CB with the EDEP level less than (<) n, are not executed at the execution unit 110. This continues until a CB of EDEP level (>=) n is seen. In this scenario, execution of the control block begins again until another failed control block is detected.

The EDEP processor 108 is configured to receive a response word (RspW) from the execution unit 110 and provide it to the response word handler 112 to notify the host processor 102 of the status of the control blocks. The RspW can indicate a successful execution, an error, or discarding of a control block. It should be understood the RspW can indicate additional information to the host processor 102.

In one or more embodiments of the invention, the host processor 102 of the system 100 can adjust the EDEP level maintained at the EDEP processor 108 by sending a NULL CB. In a non-limiting example, a NULL CB with the EDEP=3 is transmitted to the EDEP processor and upon receipt, the EDEP processor 108 is configured to 3. It should be understood the NULL CBs will execute without error. Alternatively, the host processor 102 can provide a CB with an EDEP=3 directly to the EDEP processor 108 to reset the dependency chain. In an example, when the NULL CB or the reset CB is received at the EDEP processor 108, the EDEP level maintained at the EDEP processor 108 can be initialized to a highest EDEP level and will be reset to the highest level when new dependency chain is identified.

Figure 2A:
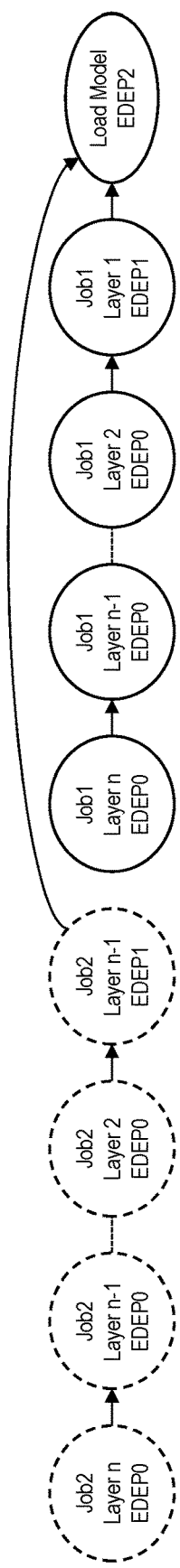
FIGS. 2A and 2B depict example control sequence having dependencies in accordance with one or more embodiments of the invention.
Figure 2B:
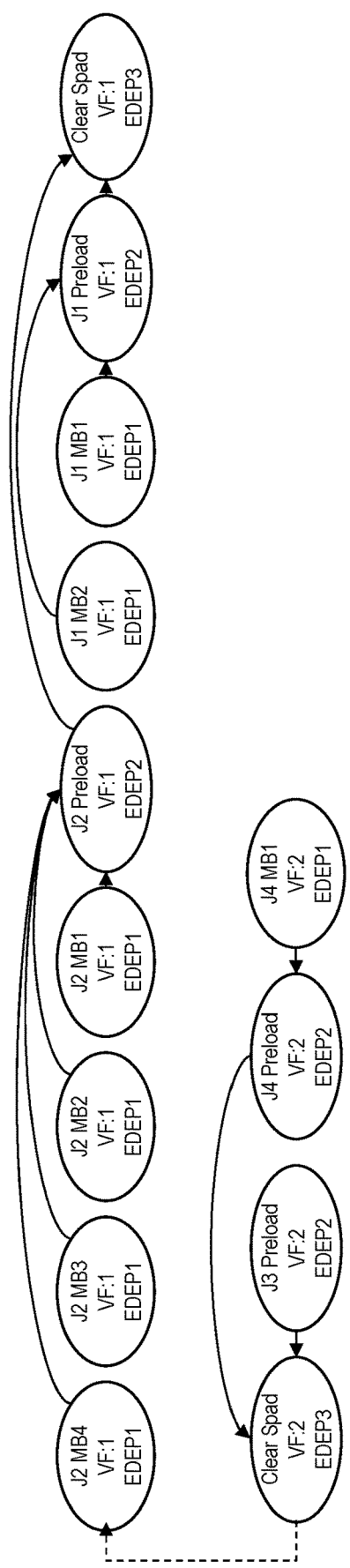

As shown in FIGS. 2A and 2B, an error dependency example for identifying dependencies in a control sequence among a plurality of control blocks is provided. A plurality of control blocks is shown where one or more control blocks may be used to define a job. Each of the control blocks are queued into control block storage queue 104 in a particular sequence prior to execution. Each control block may include the job number and an EDEP level. As shown in the non-limiting error dependency example in FIG. 2A, two jobs (Job1, Job2) are represented by the plurality of control blocks. Job1 is the first job to be enqueued into the control block storage queue 104 and provided to the EDEP processor 108 followed by Job2 which is the second job. Each of the jobs (Job1, Job2) includes multiple control blocks, and as shown, the rightmost control block includes the highest EDEP level (EDEP level 2) and each subsequent control block includes an EDEP level that is less than or equal to that of the rightmost control block. As the control blocks reaches the head of the control block storage queue 104, each control block will be transmitted to the EDEP processor 108 and if a failure is detected, the EDEP level of the control block will be compared to the maintained EDEP level at the EDEP processor 108.

In a scenario where the EDEP processor 108 determines the rightmost control block has failed, each of the subsequent control blocks will be abended. Consider the example, where the second control block (Job1, Layer1) with an EDEP level=1 fails, then all the subsequent jobs/control blocks with an EDEP level=0 will not be executed since they have a lower EDEP level. In another example, if the control block (Job1, Layer2) fails, then all subsequent control blocks/jobs with an EDEP level=0 will not be executed at the execution unit 110. If the control block (Job2, Layer1) is successfully executed (without error), the remainder of the jobs/control blocks will be executed until a failed control block is detected.

In another error dependency example such as that shown in FIG. 2B, 4 different jobs (J1, J2, J3, J4) are represented. The first job (J1) is enqueued into the control block storage queue 104 followed by the subsequent jobs (J2, J3, J4). The first control block of J1 to be processed is "Clear Spad" EDEP3 and the control block J4 MB1, EDEP1 is the last to be processed. In the scenario where the rightmost job "Clear Spad" with an EDEP level=3 fails, each of the control blocks until the next "Clear Spad" VF: 2, with EDEP3 is not executed. That is, the control blocks (J1 Pre-load, J1 MB1, J1 MB2, J2 Preload, J2 MB1, J2 MB2, J2 MB3, J2 MB4) are not executed by the execution unit 110 because the right most control block "Clear Spad" fails.

However, if only the control block (J1 MB1) fails, the next job (J2, MB2) can still be executed. If the control block corresponding to the J1 preload step fails, then both control blocks (J1 MB1, J1 MB2) would not be executed, but the jobs (J2, J3, J4) may continue to be processed.

Now with reference to FIG. 3, a flowchart of a method 300 for identifying dependencies in a control sequence in accordance with one or more embodiments is shown. The method 300 can be executed in a system such as the system 100 shown in FIG. 1. It should be understood the method 300 can also be performed in other systems and is not limited to that shown in FIG. 1. The method 300 begins at block 302 and proceeds to block 304 which provides for receiving, at the error dependency (EDEP) processor 108, a control block, wherein the control block includes a first EDEP level. The EDEP level indicates the dependencies among the control blocks.

Block 306 maintains, at the EDEP processor 108, the first EDEP level. The EDEP processor 108 maintains the EDEP level of the latest control block which enables the EDEP processor 108 to determine the dependency among control blocks in the control sequence.

Block 308 determines whether the received control block was successfully executed. The EDEP processor 108 determines whether the control block was successfully executed at the execution unit 110 responsive to receiving an indication or response from the execution unit 110. Block 310 receives a subsequent control block that includes a second EDEP level. The EDEP processor 108 receives the subsequent control block having an EDEP level from the control block storage queue 104.

Block 312 comparing the first EDEP level and the second EDEP level. In one or more embodiments of the invention, if the EDEP level of the received control block is greater than the EDEP level maintained in the EDEP processor 108, the EDEP level is updated. Receiving the EDEP level that is greater than the maintained EDEP level can indicate that a new sequence of control blocks that is independent of the previous control blocks has been received.

Block 314 providing the subsequent control block for execution based at least in part on the successful execution of the received control block and on the second EDEP level being less than or equal to the first EDEP level. If no failure or error is detected in the execution of the control block, the subsequent control block can be provided to and executed at the execution unit 110. However, if a failure is detected in the control block, the subsequent control blocks that depend on the failed control block will not be provided to and executed by the execution unit 110. Those control blocks that have been identified as dependent on the failed control block based on the EDEP level will not be processed and the next control block that is not dependent on the failed control block, also indicated by the EDEP level can be processed. Therefore, processing of other control blocks is no longer delayed by the processing of control blocks that are dependent upon a failed control block.

The method 300 ends at block 316. It should be understood that the method 300 is not intended to be limited by the steps shown in FIG. 3 but additional steps and/or a different sequence of steps can be included to identify the dependencies in a control sequence in accordance with one or more embodiments of the invention.

Referring now to FIG. 4, a schematic of an example of a computing node is shown. The computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in computing node 10 is shown in the form of a general-purpose computing device. The components of computer system/server 12 may include, but are not limited to, one or more processors or processing units 11, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The techniques described herein improve over the prior art by increasing the processing speed of control blocks in a control sequence by reducing delay of processing non-dependent control blocks. The EDEP level allows the system to discard control blocks that are dependent upon failed control blocks. Those control blocks that are not dependent on the failed control block are allowed to be processed without be delayed by processing control blocks that are dependent on the failed control block.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A computer-implemented method for identifying dependencies in a control sequence, the computer-implemented method comprising:
    receiving, at a processor, a control block that comprises a first error dependency (EDEP) level;
    maintaining, at the processor, the first EDEP level;
    determining whether the received control block was successfully executed;
    receiving a subsequent control block that comprises a second EDEP level;
    comparing the first EDEP level and the second EDEP level; and
    providing the subsequent control block for execution based at least in part on the successful execution of the received control block, and on the second EDEP level being less than or equal to the first EDEP level.

2. The computer-implemented method of claim 1, wherein the EDEP level defines a hierarchical dependency among a sequence of control blocks.

3. The computer-implemented method of claim 1, wherein the determining comprises receiving, from an execution unit, an indication of a successful execution of the control block.

4. The computer-implemented method of claim 1, further comprising transmitting, from the processor, a response word to a host processor, wherein the response word indicates whether the control block was successfully executed at the execution unit.

5. The computer-implemented method of claim 1, further comprising resetting the EDEP level maintained at the processor responsive to receiving a reset command from a host processor.

6. The computer-implemented method of claim 1, further comprising initializing the EDEP level maintained at the EDEP processor to a starting value.

7. The computer-implemented method of claim 1, further comprising abending, at the processor, additional subsequent control blocks based at least in part on the EDEP level of a failed control block.

8. The computer-implemented method of claim 1, further comprising providing additional subsequent control blocks to the execution unit if the EDEP levels of the additional subsequent control blocks exceed the maintained EDEP level.

9. A system for identifying dependencies in a control sequence for execution on a hardware accelerator, the system comprising:
   a host processor configured to assign error dependency (EDEP) levels to control blocks;
   a control block storage queue configured to store the control blocks; and
   an EDEP processor configured to:
      receive a control block that comprises a first error dependency level;
      maintain the first EDEP level;
      determine whether the received control block was successfully executed;
      receive a subsequent control block that comprises a second EDEP level;
      compare the first EDEP level and the second EDEP level; and
      provide the subsequent control block for execution based at least in part on the successful execution of the received control block, and on the second EDEP level being less than or equal to the first EDEP level.

10. The system of claim 9, wherein the EDEP level defines a hierarchical dependency among a sequence of control blocks.

11. The system of claim 9, further comprising an execution unit configured to provide an indication of a successful execution of the control block to the EDEP processor.

12. The system of claim 9, wherein the EDEP processor is further configured to transmit a response word to the host processor, wherein the response word indicates whether the control block was successfully executed at the execution unit.

13. The system of claim 9, wherein the host processor is further configured to reset the EDEP level maintained at the EDEP processor responsive to receiving a reset command from the host processor.

14. The system of claim 9, wherein the host processor is further configured to initialize the EDEP level maintained at the EDEP processor to a starting value.

15. The system of claim 9, wherein the EDEP processor is further configured to abend additional subsequent control blocks based at least in part on the EDEP level of a failed control block.

16. The system of claim 9, wherein the EDEP processor is further configured to provide additional subsequent control blocks to the execution unit if the EDEP levels of the additional subsequent control blocks exceeds the maintained EDEP level.

17. A computer program product for identifying dependencies in a control sequence for execution on a hardware accelerator, the computer program product comprising:
   a computer readable storage medium having stored thereon first program instructions executable by a processor to cause the processor to:
      receive a control block that comprises a first error dependency level;
      maintain the first EDEP level;
      determine whether the received control block was successfully executed;
      receive a subsequent control block that comprises a second EDEP level;
      compare the first EDEP level and the second EDEP level; and
      provide the subsequent control block for execution based at least in part on the successful execution of the received control block, and on the second EDEP level being less than or equal to the first EDEP level.

18. The computer program product of claim 17, wherein the determining comprises receiving, from an execution unit, an indication of a successful execution of the control block.

19. The computer program product of claim 17, wherein the instructions are further executable by a processor to cause the processor to abend additional subsequent control blocks based at least in part on the EDEP level of a failed control block.

20. The computer program product of claim 17, wherein the instructions are further executable by a processor to cause the processor to provide additional subsequent control blocks to the execution unit if the EDEP levels of the additional subsequent control blocks exceed the maintained EDEP level.

* * * * *